United States Patent
Iwamura

(10) Patent No.: US 8,544,045 B2
(45) Date of Patent: Sep. 24, 2013

(54) HOME NETWORK AUDIO CLIENT WITH DETACHABLE REMOTE COMMANDER

(75) Inventor: Ryuichi Iwamura, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1419 days.

(21) Appl. No.: 11/141,804

(22) Filed: May 31, 2005

(65) Prior Publication Data

US 2006/0165063 A1 Jul. 27, 2006

Related U.S. Application Data

(60) Provisional application No. 60/645,899, filed on Jan. 21, 2005.

(51) Int. Cl.
*H04N 7/18* (2006.01)
*G06F 3/00* (2006.01)

(52) U.S. Cl.
USPC .............. 725/74; 725/49; 725/50; 725/79; 725/81

(58) Field of Classification Search
USPC .......................................................... 725/74
See application file for complete search history.

(56) References Cited

U.S. PATENT DOCUMENTS

| | | | |
|---|---|---|---|
| D261,884 S | 11/1981 | Crisp | 414/106 |
| 4,450,487 A | 5/1984 | Koide | 358/335 |
| D295,862 S | 5/1988 | Yonekura | D14/84 |
| 5,890,017 A | 3/1999 | Tulkoff et al. | |
| 5,896,444 A | 4/1999 | Perlman et al. | 379/93.35 |
| 5,926,789 A | 7/1999 | Barbara et al. | 704/275 |
| 6,192,236 B1 | 2/2001 | Irvin | 455/420 |
| 6,415,303 B1 | 7/2002 | Meier et al. | 707/500.1 |
| 6,594,699 B1 | 7/2003 | Sahai et al. | 709/228 |
| 6,792,323 B2 | 9/2004 | Krzyzanowski et al. | 700/90 |
| 6,809,759 B1 | 10/2004 | Chiang | 348/211.2 |
| 2001/0041556 A1* | 11/2001 | Laursen et al. | 455/406 |
| 2002/0010759 A1* | 1/2002 | Hitson et al. | 709/219 |
| 2003/0045955 A1* | 3/2003 | Janik | 700/94 |
| 2003/0182100 A1* | 9/2003 | Plastina et al. | 704/1 |
| 2003/0192054 A1 | 10/2003 | Birks et al. | |
| 2004/0107268 A1* | 6/2004 | Iriya et al. | 709/219 |
| 2004/0117276 A1* | 6/2004 | Kettler, III | 705/29 |
| 2004/0139108 A1* | 7/2004 | Tang et al. | 707/104.1 |
| 2004/0152414 A1 | 8/2004 | Wang | |

(Continued)

FOREIGN PATENT DOCUMENTS

CN 1490579 4/2004
GB 2394032 4/2004

OTHER PUBLICATIONS

Handbook for the Palm III Organizer http://www.palm.com/us/support/handbooks/palm3.pdf.*

(Continued)

*Primary Examiner* — Brian Pendleton
*Assistant Examiner* — Jean D Saint Cyr
(74) *Attorney, Agent, or Firm* — John L. Rogitz

(57) ABSTRACT

An audio client in a home entertainment system has a detachable remote commander with a display screen. A menu of music available at the server is downloaded to the remote commander from the server over the network and through the client device. The user can easily select a tune he/she wants to listen to using the remote commander. With storage and decoding capability, the commander can be used as a portable audio player.

9 Claims, 6 Drawing Sheets

(56) References Cited

U.S. PATENT DOCUMENTS

| | | | |
|---|---|---|---|
| 2005/0244025 A1* | 11/2005 | Schul et al. | 381/334 |
| 2006/0058951 A1* | 3/2006 | Cooper et al. | 701/208 |
| 2006/0143236 A1* | 6/2006 | Wu | 707/104.1 |
| 2008/0109560 A1* | 5/2008 | Ferguson et al. | 709/238 |

OTHER PUBLICATIONS

High-speed Auto-Sync for Mac and Windows http://web.archive.org/web/20040707011804/http://www.apple.com/ipod/autosync.html.*

High-speed Auto-Sync for Mac and Windows http://web.archive.org/web/20040707011804/http://www.apple.com/ipod/autosync.html(Jul. 7, 2004).*

Handbook for the Palm III Organizer http://www.palm.com/us/support/handbooks/palm3.pdf(Sep. 15, 2003).*

"A multi-room system that's flawless, flexible and fun." printed from website Nov. 10, 2010; http://sonos.com/experience/multiroom/Default.aspx?rdr=true&LangType-1033.

"Sonos ZonePlayers" printed from website Nov. 10, 2010; http://sonos.com/products/zoneplayers/Default.aspx?rdr=true&LangType=1033.

"Sonos Controllers" printed from website Nov. 10, 2010; http://sonos.com/products/controllers/Default.aspx?rdr=true&LangType=1033.

* cited by examiner

Fig. 2 AUDIO SERVER

AUDIO CLIENT AND REMOTE COMMANDER

REMOTE COMMANDER

REMOTE COMMANDER

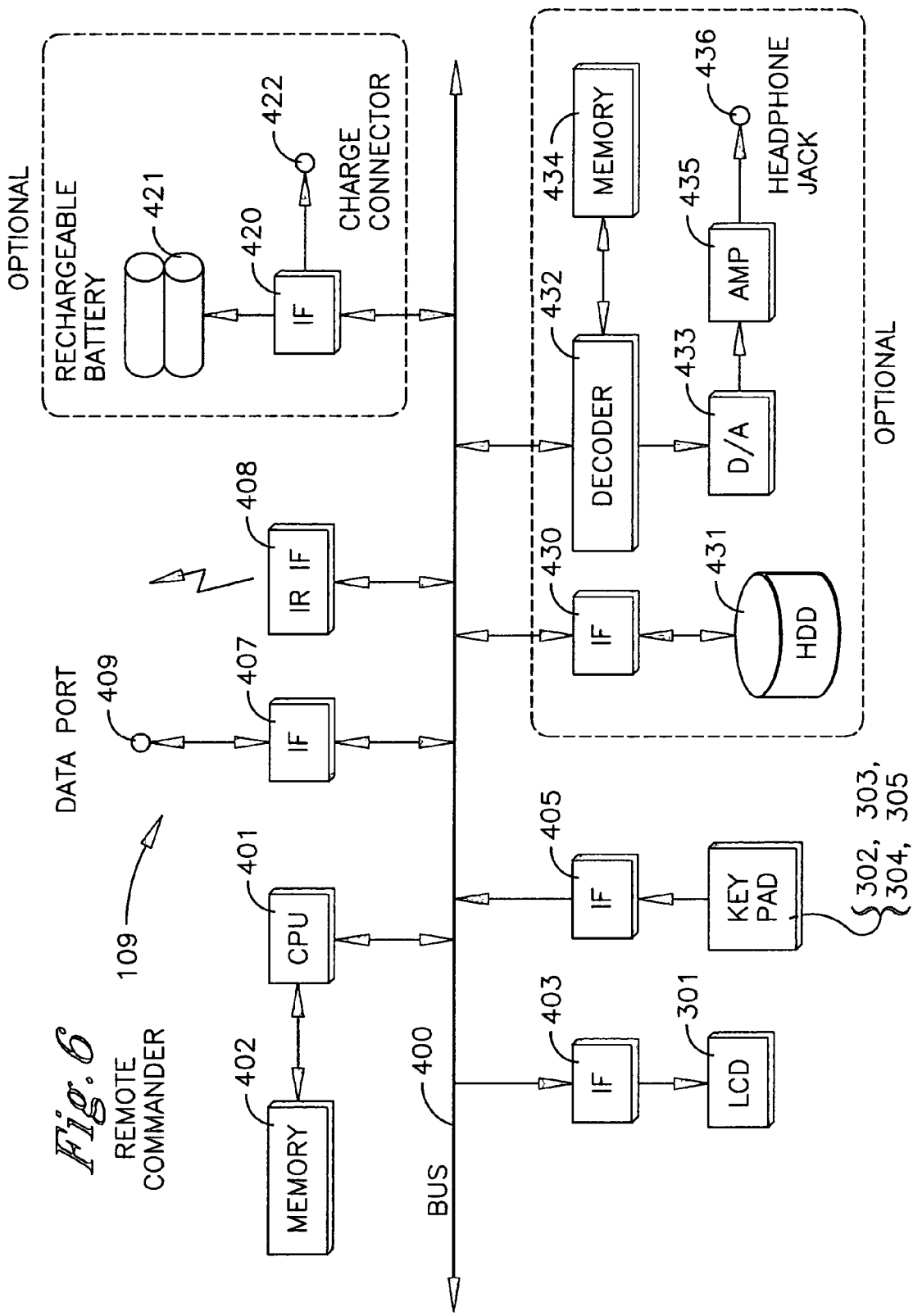

HOME NETWORK AUDIO CLIENT WITH DETACHABLE REMOTE COMMANDER

RELATED APPLICATIONS

This application claims priority from U.S. provisional patent application Ser. No. 60/645,899, filed Jan. 21, 2005.

FIELD OF THE INVENTION

The present invention relates generally to home entertainment networks.

BACKGROUND OF THE INVENTION

Home entertainment networks have been introduced in which a central server can serve various entertainment devices, referred to as "clients", throughout the home. Of relevance to the present invention are both audio-video clients and audio-only clients, i.e., devices that play only audio and that do not also play video.

The present invention critically recognizes that with respect to current audio clients, various drawbacks exist relating to user friendliness. As an example, the "Microlink dLAN audio adapter" provided by Devolo is a network-based audio adapter that unfortunately does not allow a user to select a music tune from the client side. Instead, the user must access the central server, and this is inconvenient. As another example, the present assignee's "RoomLink" Ethernet system has an MPEG decoder with a graphic user interface that a user can manipulate to select a video stream that is stored in the network server (PC), but as recognized herein the "RoomLink" audio player itself does not have a display. Instead, a TV set must be connected to it to present the GUI, an approach that is less than optimum for cost sensitive audio products such as, e.g., a "boom box" type product that typically has no display capability. Accordingly, as critically recognized herein a need exists to provide the capability to show a music list and to select a tune from the client audio player without having to do so from the system server.

SUMMARY OF THE INVENTION

The present invention provides an inexpensive audio client solution to the problems noted above. The client has a detachable remote commander that has a display screen. The music menu data is downloaded to the remote commander so that the user can easily select a tune and play it. Also, by adding storage and decoding capability, a portable audio player can be established by the remote commander.

Accordingly, in one aspect a home entertainment system includes a server having access to audio files and a client device communicating with the server using a home entertainment network. A remote commander is detachably engaged with the client device and displays an audio file menu received from the server through the client device for user selection of an audio file on the server, to be played on the client device.

The client device may be an audio-only client device. The remote commander may include a display for displaying the menu and manipulable buttons for inputting user commands. In some implementations the remote commander wirelessly transmits a user selection to the client device, which in turn requests the selection from the server. The network can be a power line network and the remote commander can be implemented by a wireless telephone. If desired, the remote commander itself can play audio streams.

In another aspect, a method for playing a multimedia stream includes storing the stream at a server in a home entertainment system, and transmitting a menu of multimedia streams from the server to a client device in the home entertainment system. The method also includes transmitting the menu to a remote commander that is detachably engageable with the client device such that the menu is displayed on the remote commander. Using the remote commander, a user request that is generated by a user manipulating the remote commander can be sent to the client device and in turn to the server. In response to the request, the method includes sending a multimedia stream to the client device for display thereon.

In still another aspect, a client device system for a home entertainment network including a server accessing multimedia files includes a client device having at least the capability to play audio streams. The client device communicates with the server over the network. Means that are detachably engaged with the client device are provided for displaying menus of available multimedia streams and for receiving user selections of the streams. The means communicate with the client device through a data port when engaged with the client device, with the means being manually detachable from the client device and, when detached, wirelessly communicating with the client device.

The details of the present invention, both as to its structure and operation, can best be understood in reference to the accompanying drawings, in which like reference numerals refer to like parts, and in which:

BRIEF DESCRIPTION OF THE DRAWINGS

FIG. 6 is a block diagram of a remote commander for the audio client.

DETAILED DESCRIPTION OF THE PREFERRED EMBODIMENT

Figure 1:
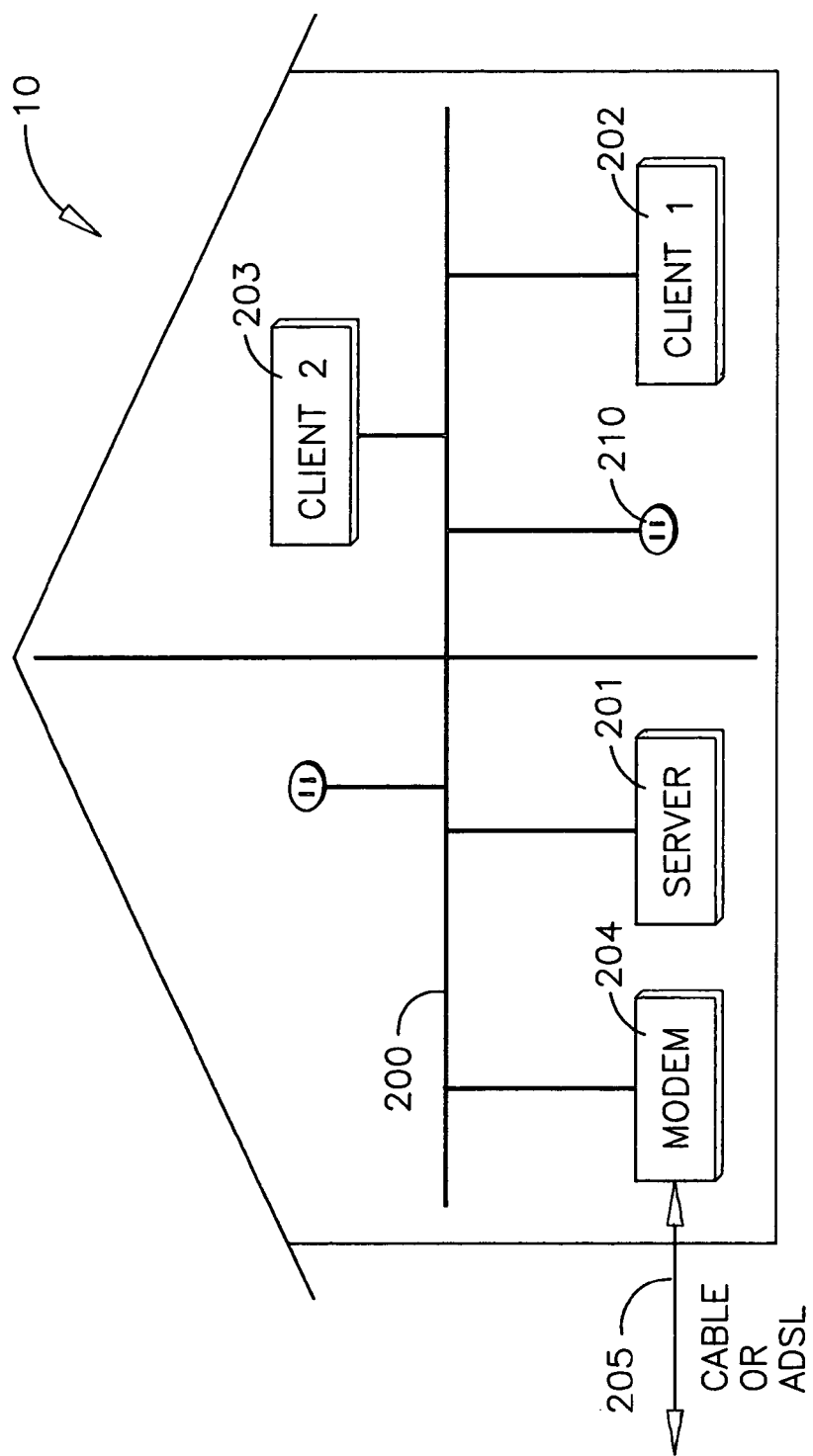
FIG. 1 is a block diagram of a home entertainment system in which the present audio client can be used.

Referring initially to FIG. 1, a home entertainment system is shown, generally designated 10, in which a power line 200 is used to interconnect various components in the system 10, it being understood that the principles herein may also be applied to home entertainment network backbones including, e.g., 802.11 wireless or Ethernet. The system 10 may be audio-video and may have audio-only clients or the system 10 itself may be audio-only.

In the embodiment shown in FIG. 1, the system 10 includes a server 201 and one or more client devices communicating with the server 201 over the power line 200. For example, first and second client devices 202, 203 may be connected to the power line 200 to communicate with the server 201, which stores, among other things, audio data that may be encoded from CDs. As set forth further below, a user can select a music tune from one or both of the client devices 202, 203, which may be audio-only clients such as "boom boxes". In response to the user selection, the server 201 sends the music data to the client over the power line 200. The client devices 202, 203 may receive the same data or different data independently of each other. In any case, audio data also may be downloaded to the server 201 from the Internet or elsewhere through a modem 204 that may be connected to a cable or ADSL network 205 and the power line 200, for storage of the downloaded music in the below-described hard disk drive (HDD) of the server 201. Various ac power line plugs 210 may be provided on the power line 200.

Figure 2:
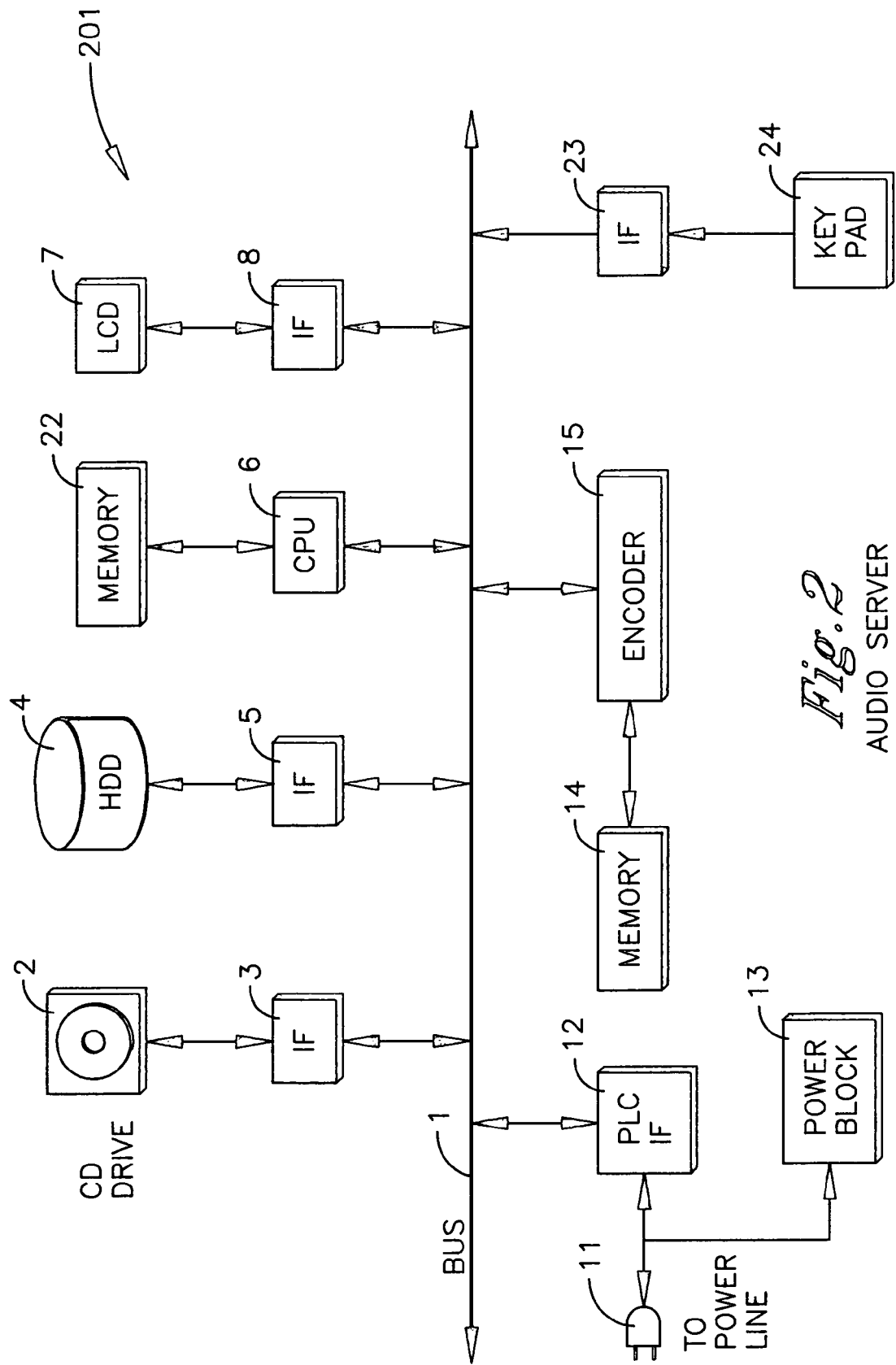
FIG. 2 is a block diagram of a non-limiting audio server.

FIG. 2 shows a non-limiting implementation of the server 201. A server central processing unit (CPU) 6 can control the other server components through an internal communication bus 1. The control software program executed by the CPU 6 may be stored in a local memory 22, which may be, e.g., ROM or RAM. A power plug 11 is configured for plugging into a wall socket and thus connect to the power line 200. As shown, the power plug 11 is connected to a server PLC interface 12 and to a server power block 13 that may be, for example, a switching regulator that supplies DC power to each component.

A music disk such as a CD can be engaged with a CD drive 2, which can read the unique ID number of the CD and send it to the server CPU 6 through a CD interface 3 via the server bus 1. Data from the CD drive 2 may be stored by the server CPU 6 in a server storage such as a server HDD 4, which can include, e.g., a factory-installed music database. The music database may include, for example, more than 500,000 CD titles, and the CPU 6 can query the database in response to the below-described user requests to obtain a requested CD title, the associated artist names, the associated track list, and other information. The music title IDs preferably are stored in an index table in another area of HDD 4 and are associated with their relevant recorded audio data. Such a storage may be implemented by the storage paradigm in the present assignee's commercially available "Net Juke" NAS-A1 product. Alternatively or in addition, the user may input CD information using, e.g., a keypad 24, which can have an associated keypad interface 23 to the internal server bus 1, and an LCD display 7, which can have an associated LCD interface 8 to the internal server bus 1. The LCD 7 is, for example, a forty-character by twenty-line display, and it can display character data sent from the server CPU 6 through the LCD interface 8.

As also shown in FIG. 2, in some implementations audio data from the CD may be sent to a server codec 15 which can compress the original CD data to, for example, one-tenth using compression algorithms that may be stored in a compression memory 14. Compressed audio data may be stored to the server HDD 4. As mentioned above, audio data may also be received by the server from the Internet.

Music streams in the HDD 4 are correlated to music menu data stored in the HDD 4. As described below, the music menu data is sent to a client through the power line 200, with updated information preferably being sent to the client every time the music menu is modified. When a client sends the server 201 a music reference ID request, the server CPU 6 receives the ID, correlates it to the associated music stream, and starts sending the requested audio stream stored in the HDD 4 to the client over the powerline network. The server 201 controls the audio data stream in response to commands (e.g., pause, fast forward, skip to next/previous tune, etc.) from the client by means of the below-described remote commander.

Figure 3:
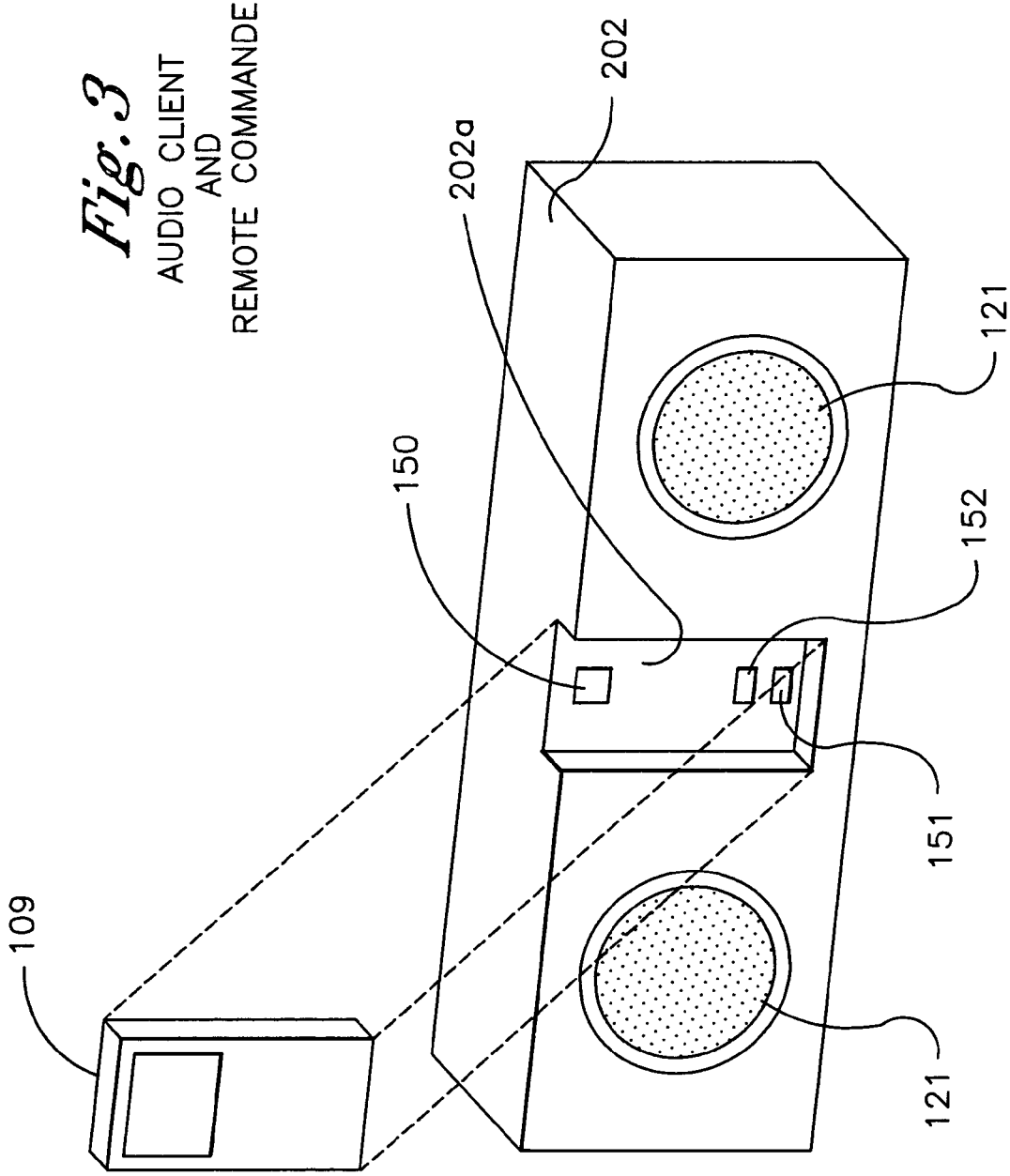
FIG. 3 is a perspective view showing the remote commander in an exploded relationship with the audio client.

Accordingly, turning now to FIG. 3 for an understanding of a non-limiting implementation of the client device 202 with associated remote commander 109, the remote commander 109 is manually attachable to and detachable from the client device 202. For instance, the remote commander 109 may engage a bay 202a of the client device 202 in an interference fit that can be overcome by hand to remove the remote commander from the bay. Snapping engagement may be used, or detents, or a simple friction fit or any other suitable engagement structure may be used for enabling easy manual engagement and disengagement of the remote commander 109 with the client device 202.

A wireless signal receiver 150 may be mounted on the housing of the client device 202 as shown and may communicate with control structure within the client device 202 as more fully disclosed below. In one embodiment the receiver 150 is an infrared (IR) reception window that can receive IR commands from the remote commander 109 when it is disengaged from the client device 202. Also, a connector 151 for battery charging connection optionally may be included on the housing of the client device 202, as well as a data port 152 to download a music menu or audio data to the remote commander 109 when it is physically engaged with the bay 202a of the remote commander 202. As set forth further below, when the remote commander 109 is attached to the client device 202, it works as a user interface block that has a display and buttons. In the non-limiting implementation shown, the client device 202 is an audio-only player, consequently having one or more speakers 121 but not having any display capability apart from the remote commander 109.

Figure 4:
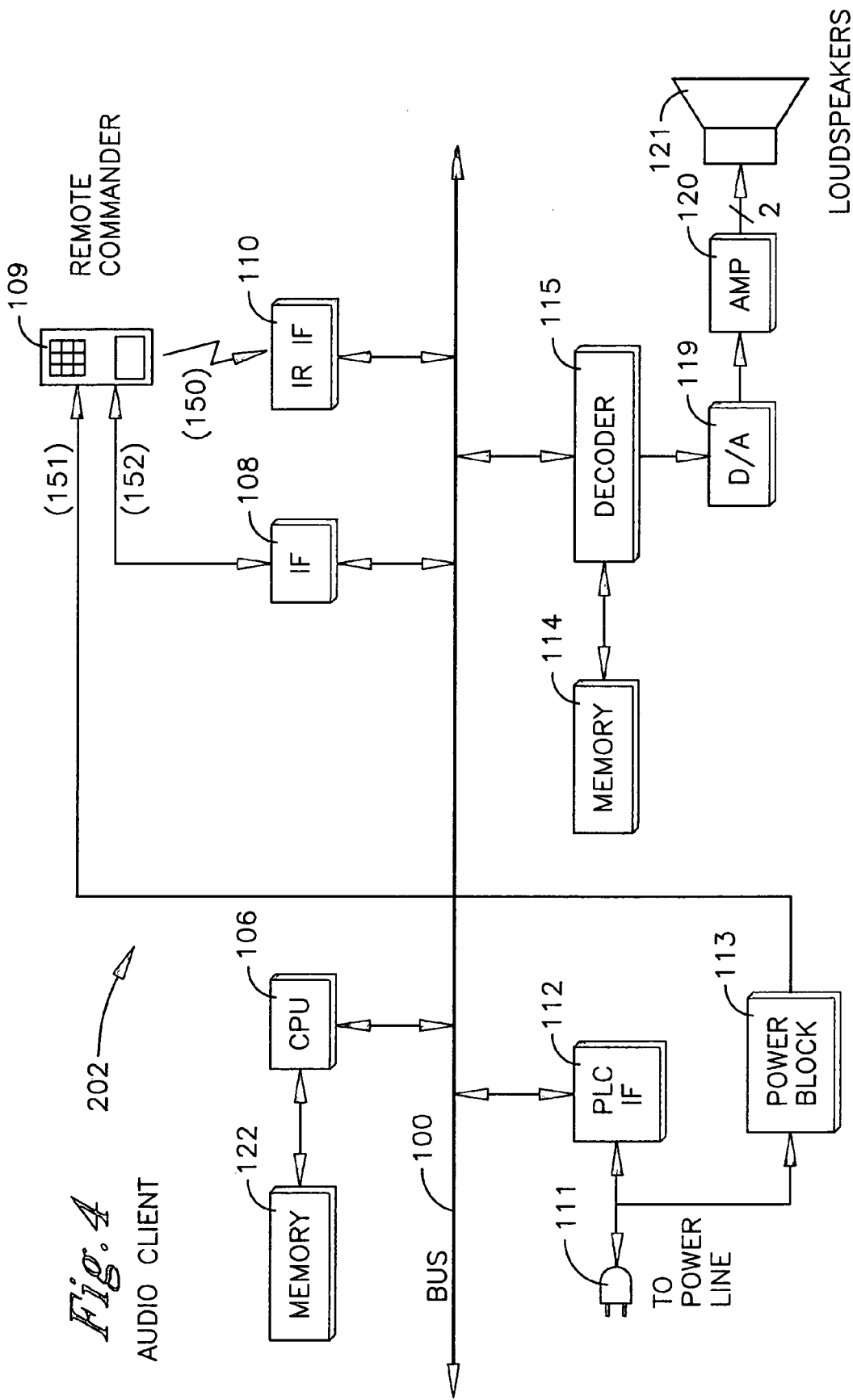
FIG. 4 is a block diagram of an audio client.

Now referring to FIG. 4, the internal components of one non-limiting implementation of the client device 202 may be seen. A client CPU 106 controls all the components in the client device 202 that are connected to an internal client data bus 100. Under control of logic resident in, e.g., a client CPU memory 122, the client CPU 106 communicates with the server 201 through a client PLC interface 112 and thence through a power plug 111 that is connected to the power line 200. A client power block 113 that can be, for example, a switching regulator, supplies power from the power line 200 to the relevant components in the client device 202. Audio stream data received from the server may be sent to a client decoder 115 from the PLC interface 112 through the internal bus 100. The decoder 115 decodes the data using logic that may be stored in, e.g., a client decoder memory 114. The decoded audio can be digital-to-analog converted in a DAC 119, amplified in an amplifier 120, and played by the speakers 121.

An IR interface 110 is also provided to receive IR commands (e.g., play, stop, pause, skip) from the remote commander 109. Additionally, a data port interface 108 may be provided on the client internal bus 100 as shown to exchange data with the remote commander 109. The data port is mainly used to download the music menu data or audio data to the remote commander through the data port 152 shown in FIG. 3. As another option, if the remote commander is engaged with the client device 212 in rechargeable battery operation, the power block 113 also supplies power for the battery charge to the remote commander 109 through the connector 151 shown in FIG. 3.

When the remote commander is attached to the client 202, the music menu data is downloaded from the server to the remote commander. Specifically, music menu data may be sent by the server CPU 6 through the server PLC interface 12, across the power line 200, and through the client PLC interface 112 to the client CPU 106. Then, the menu can be sent through the remote commander interface 108 to the remote commander, for visual display in accordance with disclosure below. If desired, every time the music menu data is modified in the server, it can be updated at the client device. When two or more servers exist on the network, the client 202 may receive music menu data from each server, in which case the client CPU 106 combines them to a set of music menu data and downloads the set to the remote commander 109, sorting, if desired, the menu data alphabetically so that the user easily selects a tune. Consequently, the user does not have to know what tune is in what server. He/she simply selects a tune regardless of where it is stored. Note that the size of the music menu data is relatively small, including music titles, name of composer and performer, length, etc., i.e., it is mostly text data, although the menu may include some photo files.

Figure 5B:
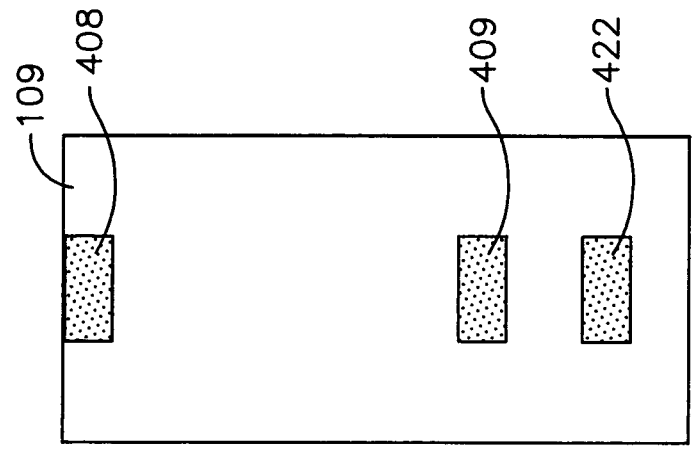
FIGS. 5a and 5b are plan views of the front and back, respectively, of a non-limiting remote commander.
Figure 5A:
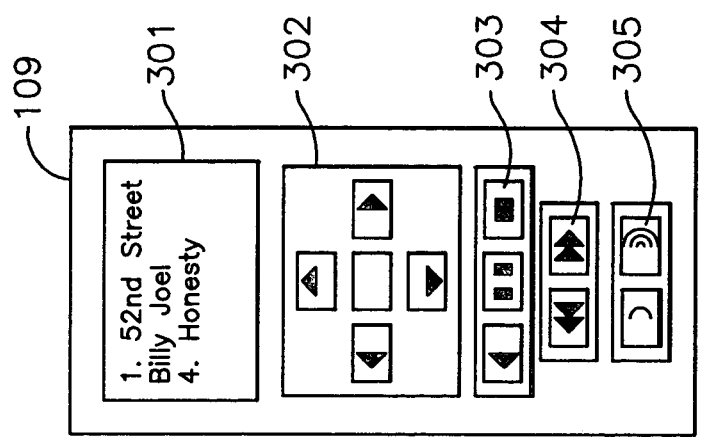

FIGS. 5A and 5B show details of the exterior structure of the remote commander 109. As shown in FIG. 5A, a display 301 such as but not limited to an LCD display is on the remote commander 109 for displaying music titles and tracks from the menu sent to the remote commander. Cursor buttons 302 may be provided to select a title or a track from the display. Also, control buttons 303 may be provided for entering commands such as "Play", "Pause", and "Stop". Further, trick play buttons 304 can be used to input commands such as "Fast Rewind" and "Fast Forward". Volume buttons 305 can be manipulated for volume adjustment.

FIG. 5B illustrates the back of the remote commander 109. A data port 409, battery charge connector 422 (optional) and an IR interface 408 may be provided on the housing of the remote commander as shown. The data port 409 physically engages the data port 152 (FIG. 3) on the client device 202 and the battery charge connector 422 physically engages the connector 151 on the client device when the remote commander 109 is secure in the bay 202a of the client device 202. Accordingly, data may be sent to the remote commander from the client device and the remote commander may be charged through the client device when the remote commander is engaged with the client device.

On the other hand, data can be wirelessly exchanged between the client device 202 and remote commander 109 through the IR interface 408 when the remote commander is engaged and disengaged with the client device 202. In this way, client commands and music title selections selected using the controls of FIG. 5A can be sent to the client device 202 and thence to the server 201 using the wireless link provided by the IR interface 408 on the remote commander 109. Moreover, music menus from the server 201 over the power line 200 can be relayed through the client device 202 and sent to the remote commander 109 for display thereon.

FIG. 6 shows a block diagram of the internal components of an exemplary remote commander 109, which includes a remote CPU 401 that controls all the relevant components of the remote commander through an internal remote commander bus 400 by executing software that may be stored in a commander CPU memory 402. The various control buttons shown in FIG. 5A can be manipulated to input data as desired by the user to the remote CPU 401 through an appropriate data interface 405. In contrast, data to be displayed on the display 301 is sent from the remote CPU 401 to the display 301 through an appropriate display interface 403.

To send via wireless means (e.g., IR in the embodiment shown) user commands input on the remote commander 109 to the client device 202, the command is sent from the remote CPU 401 to the IR interface 408, for transmission thereat and reception thereof at the IR interface 110 of the client device 202 (FIG. 4). Also, when the remote commander 109 is engaged with the client device 202 the remote CPU 401 can exchange data with the audio client 202 through a data interface 407 which is connected to the data port 409 as shown. Music menus downloaded through the data port 409 may be stored in the memory 402 if desired.

The remote commander is battery powered and as an option, the remote commander may have rechargeable batteries 421, recharging voltage for which is supplied from the client 202 through the charge connector 422. When this option is implemented, a battery interface 420 can monitor the charge status and report it to the remote CPU 401, for control of the charging process.

Additionally, the remote commander may, in some implementations, include its own internal audio decoder 432 and associated storage device 434, to render the remote commander 109 a portable audio player. When the remote commander 109 is attached to the client device 202, selected music data can be downloaded from the server 201 to the remote commander 109 similarly to the music menu data. The stream may then be stored in an internal remote commander HDD 431 through the data port 409. The downloaded data is temporarily stored in the decoder memory 434, decoded in a decoder 432 under control of the remote CPU 401 and digital-to-analog converted in a DAC 433. The output signal from the DAC 433 can be amplified in an amplifier 435 and sent to a headphone jack 336, to which a headphone can be connected.

The remote commander 109 may have the command learning capability of, e.g., the Sony Universal Remote Commander RM-VL700S, in which case no other remote commander is required. The remote commander 109 may be used for all products: TV, video recorder, etc.

It is to be understood that while an audio-only client device 202 is discussed, present principles apply to other client devices, e.g., devices that also have video display capability. Furthermore, instead of a data port, a bi-directional IR interface may be used, which in any case is required when the above-mentioned command leaning function is implemented. Still further, the remote commander 109 may be implemented in a cell phone that may have audio decoding capability and a color LCD display and key buttons. By adding an IR transmitter to such a wireless phone along with the associated software, it can be used as the present remote commander.

In view of the foregoing, the present invention is an inexpensive, simple solution for a network audio client. It has a remote commander that is detachable, such that the principal client unit needs no user interface (buttons, display). The remote commander keeps the music menu data downloaded from the server so that the user can easily and quickly select a music tune. Further, the music menu data may be updated automatically while the remote unit is attached to the main unit. If desired, music data from plural servers may be integrated by the client device without user interaction. The system can be expanded to a portable audio player by adding an audio decoder and a storage device, and as discussed above, if desired a wireless phone can establish the remote commander with small modifications.

While the particular HOME NETWORK AUDIO CLIENT WITH DETACHABLE REMOTE as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". It is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. Absent express definitions herein, claim terms are to be given all ordinary and accustomed meanings that are not irreconcilable with the present specification and file history.

What is claimed is:

1. A home entertainment system, comprising:
   at least one server having access to audio files;
   at least one client device communicating with the server over a home entertainment network and bearing plural speakers on a housing of the client device; wherein client device may be an audio-only client device; and
   at least one remote commander detachably engageable with a bay of the client device and displaying a menu of audio streams, the music menu being received from the server through the client device for user selection of an audio stream resident on the server and to be audibly played on the speakers mounted on the housing of the client device;
   wherein in response to the user selection, the server sends the music data to the client device over the home entertainment network;
   the music menu being updated automatically while the remote commander is engaged with the bay of the client device responsive to a first determination that music menu data is modified at the server and responsive to a second determination that music menu data is modified at the server;
   wherein the remote commander includes a display for displaying the music menu, the remote commander also including its own internal audio decoder and associated storage device, to render the remote commander a portable audio player; wherein the remote commander wirelessly transmits the user selection to the client device, which in turn requests the selection from the server; and wherein the remote commander is implemented by a wireless telephone.

2. The system of claim 1, wherein the remote commander includes at least one manipulable button for inputting user commands.

3. The system of claim 1, wherein the network is a power line network.

4. The system of claim 1, wherein the remote commander can play audio streams.

5. A method for playing a multimedia stream comprising:
   storing the stream at a first server in a home entertainment system;
   transmitting a menu of multimedia streams including a music menu from the first server to a client device in the home entertainment system; wherein client device may be an audio-only client device, wherein the music menu is updated automatically while a remote commander is engaged with the bay of the client device responsive to a determination that music menu data is modified at the server;
   transmitting the menu of multimedia streams to the remote commander detachably engageable with a housing of the client device;
   displaying at least the music menu on the remote commander;
   using the remote commander, selecting a stream by manipulating the remote commander, a selection of a stream being sent to the client device;
   sending a request for a selected stream from the client device to the server;
   in response to the request, sending a multimedia stream to the client device for display of the multimedia stream thereon;
   transmitting a menu including at least a music menu from a second server to the client device;
   the client device combining the music menus from the first and second servers to render a combined music menu and sorting data in the combined menu alphabetically; wherein the remote commander includes a display for displaying the music menu and include its own internal audio decoder and associated storage device, to render the remote commander a portable audio player; wherein the remote commander wirelessly transmits the user selection to the client device, which in turn requests the selection from the server.

6. The method of claim 5, wherein the multimedia file is an audio file and the client device is an audio-only device.

7. The method of claim 5, wherein the remote commander includes at least one manipulable button for inputting user commands.

8. The method of claim 5, wherein the system is a power line network system.

9. The method of claim 5 wherein the remote commander can play audio streams.

* * * * *